United States Patent
Sasaki

(10) Patent No.: US 7,791,828 B2
(45) Date of Patent: Sep. 7, 2010

(54) LENS ASSEMBLY AND IMAGING APPARATUS

(75) Inventor: Naoki Sasaki, Saitama (JP)

(73) Assignee: Fujinon Corporation, Saitama (JP)

(*) Notice: Subject to any disclaimer, the term of this patent is extended or adjusted under 35 U.S.C. 154(b) by 0 days.

(21) Appl. No.: 12/395,921

(22) Filed: Mar. 2, 2009

(65) Prior Publication Data

US 2009/0244734 A1  Oct. 1, 2009

(30) Foreign Application Priority Data

Mar. 28, 2008  (JP) .......................... P2008-088518

(51) Int. Cl.
G02B 7/02 (2006.01)
G02B 7/18 (2006.01)
G02B 23/16 (2006.01)

(52) U.S. Cl. .................. 359/830; 359/825; 359/819; 359/512; 359/513

(58) Field of Classification Search ......... 359/694–700, 359/811–823, 825–830, 512, 513; 396/25, 396/27; 348/81, 207
See application file for complete search history.

(56) References Cited

U.S. PATENT DOCUMENTS

| 5,077,567 A | * | 12/1991 | Haraguchi et al. | ............ 396/29 |
| 5,894,369 A | * | 4/1999 | Akiba et al. | ................ 359/820 |
| 5,898,527 A | * | 4/1999 | Sawai et al. | ................ 359/819 |
| 6,507,700 B1 | | 1/2003 | Takekuma et al. | ............ 396/25 |
| 6,695,775 B2 | * | 2/2004 | Watanabe et al. | ........... 600/176 |

FOREIGN PATENT DOCUMENTS

JP  2002-90603 A  3/2002

\* cited by examiner

*Primary Examiner*—Mohammed Hasan
(74) *Attorney, Agent, or Firm*—Birch, Stewart, Kolasch & Birch, LLP

(57) ABSTRACT

An O-ring 12 is disposed on an image-side second outer peripheral surface 11_1b, which is subjected to a smoothing process, of a taking lens 11_1. The O-ring 12 is pressed by an inner surface 13a of a lens frame 13 toward the second outer peripheral surface 11_1b.

12 Claims, 6 Drawing Sheets

LENS ASSEMBLY AND IMAGING APPARATUS

CROSS-REFERENCE TO RELATED APPLICATIONS

This application is based upon and claims the benefit of priority from the Japanese Patent Application No. 2008-88518 filed on Mar. 28, 2008; the entire contents of which are incorporated herein by reference.

BACKGROUND OF THE INVENTION

1. Technical Field

The invention relates to a lens assembly equipped with a lens for forming an image using subject light on an imaging device and to an imaging apparatus having the lens assembly.

2. Description of the Related Art

Recently, cameras become mounted in vehicles. Cameras provided in vehicles are used as surveillance cameras or as driving-assistance cameras. Since display screens have been provided on driver's seats as navigation systems have become popular, the latter case is intended to display an image taken by the camera on the display screen.

In such on-board cameras, most of those are required to have waterproof performance since those are mainly used outside of vehicles. In order to achieve sufficient waterproof performance without an increase in camera size in accordance with the requirement, it has been attempted to provide, in the on-board cameras, small-sized lens assemblies excellent in waterproof performance.

FIG. 6 is a view illustrating a section of a related-art lens assembly taken along an optical axis of a taking lens.

FIG. 6 shows a lens assembly 100 including a taking lens 101_1 of a first group, a taking lens 101_2 of a second group, a taking lens 101_3 of a third group, and a taking lens 101_4 of a fourth group in order from an incident side on subject light A. Furthermore, FIG. 6 shows a lens frame 102 that houses these taking lenses 101_1, 101_2, 101_3, and 101_4, and an O-ring 103 disposed between the taking lens 101_1 and the lens frame 102. The O-ring 103 is a rubber member that exhibits waterproof performance after the taking lens 101_1 is housed in the lens frame 102. Furthermore, a material of the O-ring 103 is an ethylene propylene based rubber, a silicon rubber, or the like.

JP 2002-90603 A (corresponding to U.S. Pat. No. 6,507, 700) has proposed a technique that caulks a protrusion of a leading end of a lens frame on the front surface side of a taking lens by thermal adhesion in a state where the O-ring disposed between the outer peripheral surface of the taking lens and the inner surface of the lens frame is pressed.

In a related-art lens assembly, an O-ring is pressed by a taking lens and a lens frame, thereby securing waterproof performance. Here, the O-ring uses a rubber member. Hence, the surface of the O-ring is smooth. Generally, in a wide-angle taking lens for use in an on-board camera or a surveillance camera, a glass lens is used as a most-object side lens in order to obtain weather resistance. In the case where an outer peripheral surface of a glass lens is polished in order to perform centering, the outer peripheral surface is generally rougher than an optical functional surface. Hence, the outer peripheral surface, on which the O-ring is disposed, of the taking lens is rough. If the O-ring is pressed by the rough outer peripheral surface as described above, it is hard to make the O-ring be in sufficiently close contact with the outer peripheral surface. Accordingly, it is hard to sufficiently secure waterproof performance between the taking lens and the O-ring.

SUMMARY OF THE INVENTION

In view of the above circumstances, the invention provides a lens assembly improved in waterproof performance and an imaging apparatus.

According to an aspect of the invention, a lens assembly includes a lens, an O-ring, and a lens frame. The lens includes a first outer peripheral surface and a second outer peripheral surface. The second outer peripheral surface is provided on an image side of the first outer peripheral surface. The second outer peripheral surface has a diameter smaller by one step than that of the first outer peripheral surface. A wall surface is interposed between the first and second outer peripheral surfaces. The O-ring is disposed on the second outer peripheral surface of the lens. The lens frame has an inner surface that is in contact with the first outer peripheral surface and presses the O-ring, which is disposed on the second outer peripheral surface, toward the second outer peripheral surface. In the lens, the second outer peripheral surface is made smoother than at least one of the first outer peripheral surface and the wall surface.

Since the lens assembly is configured so that the second outer peripheral surface, on which the O-ring is disposed, is made smooth, the second outer peripheral surface is in sufficiently close contact with the O-ring. Accordingly, waterproof performance between the second outer peripheral surface and the O-ring is sufficiently secured. As a result, it is possible to provide a lens assembly improved in waterproof performance.

It is preferable that the second outer peripheral surface is smoothed by a smoothing process. Also, it is preferable that the second outer peripheral surface is smoothed by applying paint to the second outer peripheral surface.

In this manner, it is possible to easily make the second outer peripheral surface smooth.

Furthermore, it is preferable that, in the lens frame, lubricating paint is applied to a part, being in contact with the first outer peripheral surface and the O-ring, of the inner surface of the lens frame.

In this manner, the O-ring having a smooth surface can be pressed by the part, being smoothed by the lubricating paint and being in contact with the O-ring, of the inner surface of the lens frame. Hence, the lens frame and the O-ring can be in sufficiently close contact with each other. Accordingly, it is possible to more sufficiently secure waterproof performance between the lens frame and the O-ring. Furthermore, in an assembling process, by applying the lubricating paint onto the inner surface of the lens frame, it is possible to prevent situations that the O-ring gets twisted and that the O-ring is sandwiched between the lens frame and the lens, and it is possible to smoothly house the lens having the O-ring fitted thereon in the lens frame. Accordingly, it is possible to efficiently perform the assembling work.

According to another aspect of the invention, an imaging apparatus includes the lens assembly set forth above and an imaging device.

In the imaging apparatus, the above-mentioned lens assembly is provided, and thus the imaging apparatus is improved in waterproof performance.

According to the above configurations, it is possible to provide a lens assembly improved in waterproof performance and an imaging apparatus.

DETAILED DESCRIPTION OF EMBODIMENTS OF THE INVENTION

Hereinafter, embodiments of the invention will be described with reference to accompanying drawings.

Figure 1:
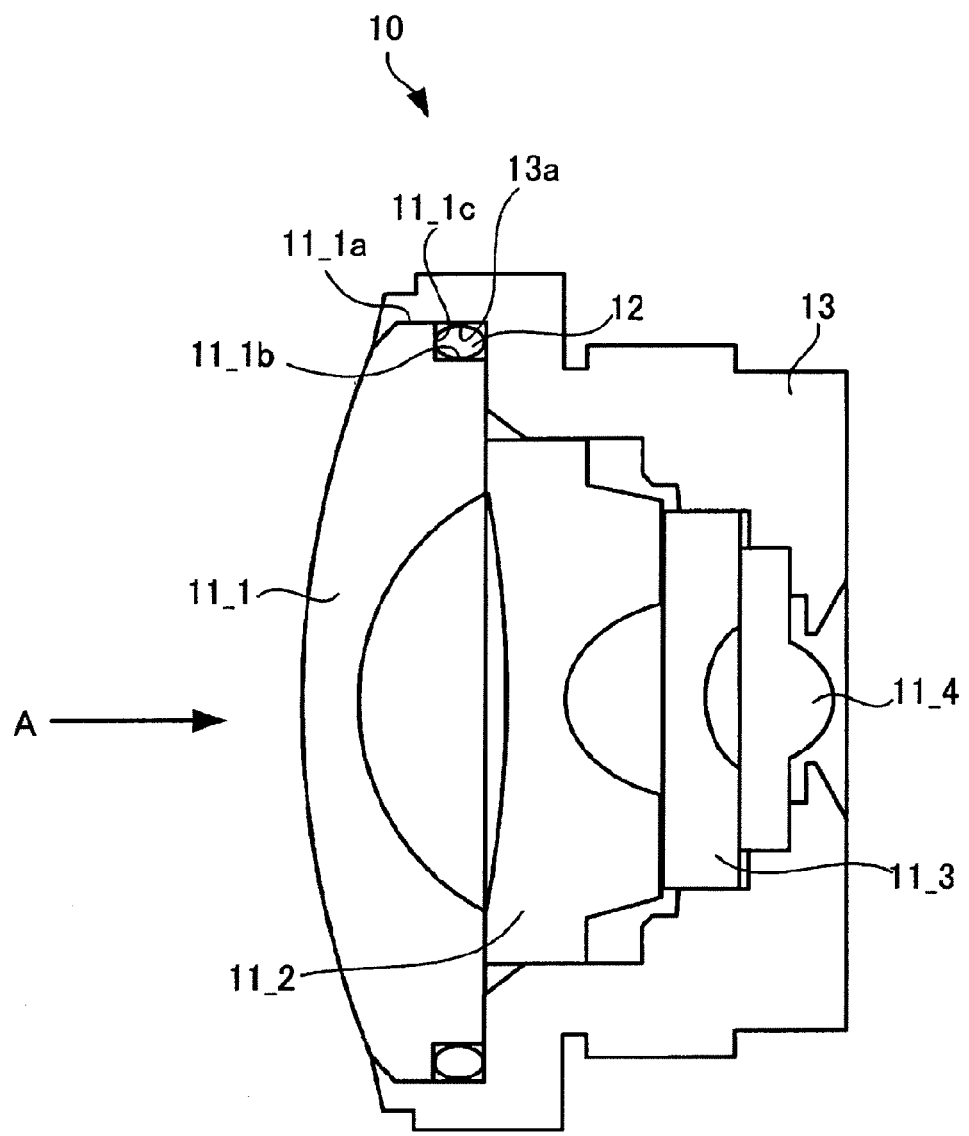
FIG. 1 is a view illustrating a section of a lens assembly according to a first embodiment of the invention, taken along an optical axis of a taking lens.
Figure 2:
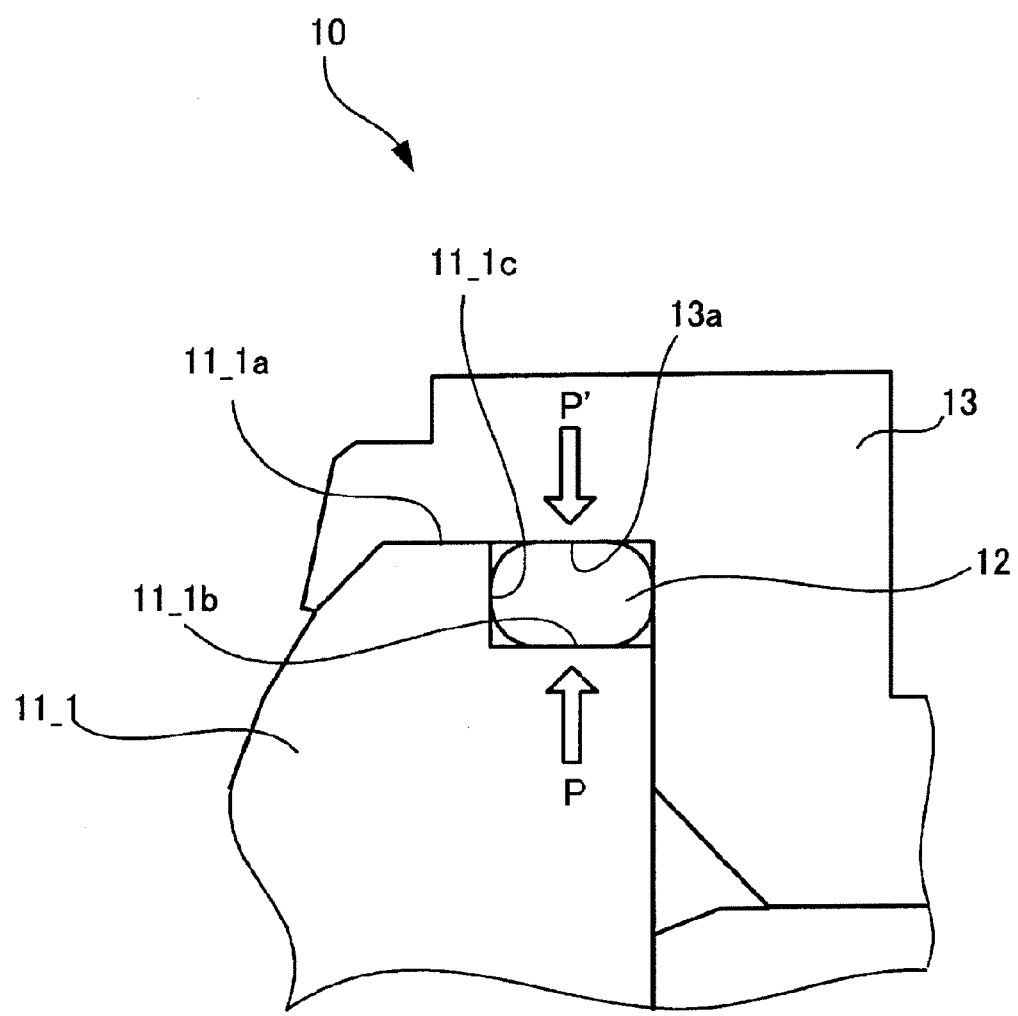
FIG. 2 is an enlarged sectional view illustrating a part, in which an O-ring is disposed, of the lens assembly shown in FIG. 1.

FIG. 1 is a view illustrating a section of a lens assembly according to a first embodiment of the invention, taken along an optical axis of a taking lens. FIG. 2 is an enlarged sectional view illustrating a part, in which an O-ring is disposed, of the lens assembly shown in FIG. 1.

A lens assembly 10 according to the first embodiment shown in FIG. 1 includes a taking lens 11_1 of a first group, a taking lens 11_2 of a second group, a taking lens 11_3 of a third group, and a taking lens 11_4 in order from an incident side of subject light A. Also, as shown in FIGS. 1 and 2, the taking lens 11_1 includes a first outer peripheral surface 11_1a, a second outer peripheral surface 11_1b and an inner wall surface 13a. The second outer peripheral surface 11_1b is provided on an image side of the first outer peripheral surface 11_1a. The second outer peripheral surface 11_1b has a diameter smaller by one step than that of the first outer peripheral surface 11_1a. The wall surface 11_c is interposed between the first and second outer peripheral surfaces 11_1a and 11_1b. Here, the second outer peripheral surface 11_1b is made smoother than the first outer peripheral surface 11_1a and the wall surface 11_c. Specifically, the second outer peripheral surface 11_1b is subjected to a smoothing process in which the second outer peripheral surface 11_1b is polished using a grind stone excellent in graininess.

Furthermore, the lens assembly 10 includes an O-ring 12 disposed on the second outer peripheral surface 11_1b. The O-ring 12 uses a rubber member. Hence, the surface of the O-ring 12 is smooth. Furthermore, a material of the O-ring 12 may be an ethylene propylene based rubber, a silicon rubber or the like.

Furthermore, the lens assembly 10 includes a lens frame 13 for housing the taking lenses 11_1, 11_2, 11_3, and 11_4. The lens frame 13 has an inner surface 13a that is in contact with the first outer peripheral surface 11_1a and presses the O-ring 12, which is disposed on the second outer peripheral surface 11_1b, toward the second outer peripheral surface 11_1b. Furthermore, the lens frame 13 is made of resin, and thus the surface of the inner surface 13a is smooth. Furthermore, after the taking lens 11_1 is housed in the lens frame 13, the anterior end of the lens frame 13 is bent by a thermal caulking, thereby holding the taking lens 11_1.

In the lens assembly 10 according to the first embodiment, the O-ring 12 is pressed in directions of arrows P and P' by the second outer peripheral surface 11_1b of the taking lens 11_1 and the inner surface 13a of the lens frame 13, thereby securing waterproof performance. Here, since the O-ring 12 uses the rubber member, the surface of the O-ring 12 is smooth. On the other hand, the taking lens 11_1 uses glass. However, as described above, the second outer peripheral surface 11_1b of the taking lens 11_1 is smoothed by the smoothing process. Thus, the second outer peripheral surface 11_1b is smooth. In this manner, the smoothed second outer peripheral surface 11_1b presses the O-ring 12 having the smooth surface. Hence, since the second outer peripheral surface 11_1b and the O-ring 12 are in sufficiently close contact with each other, waterproof performance between the second outer peripheral surface 11_1b and the O-ring 12 is sufficiently secured. Furthermore, as described above, the lens frame 13 is made of resin, and thus the inner surface 13a of the lens frame 13 is smooth. Therefore, since the inner surface 13a of the lens frame 13 and the O-ring 12 are also in sufficiently close contact with each other, waterproof performance between the inner surface 13a of the lens frame 13 and the O-ring 12 is also sufficiently secured. Accordingly, it is possible to provide the lens assembly 10 improved in waterproof performance.

Figure 3:
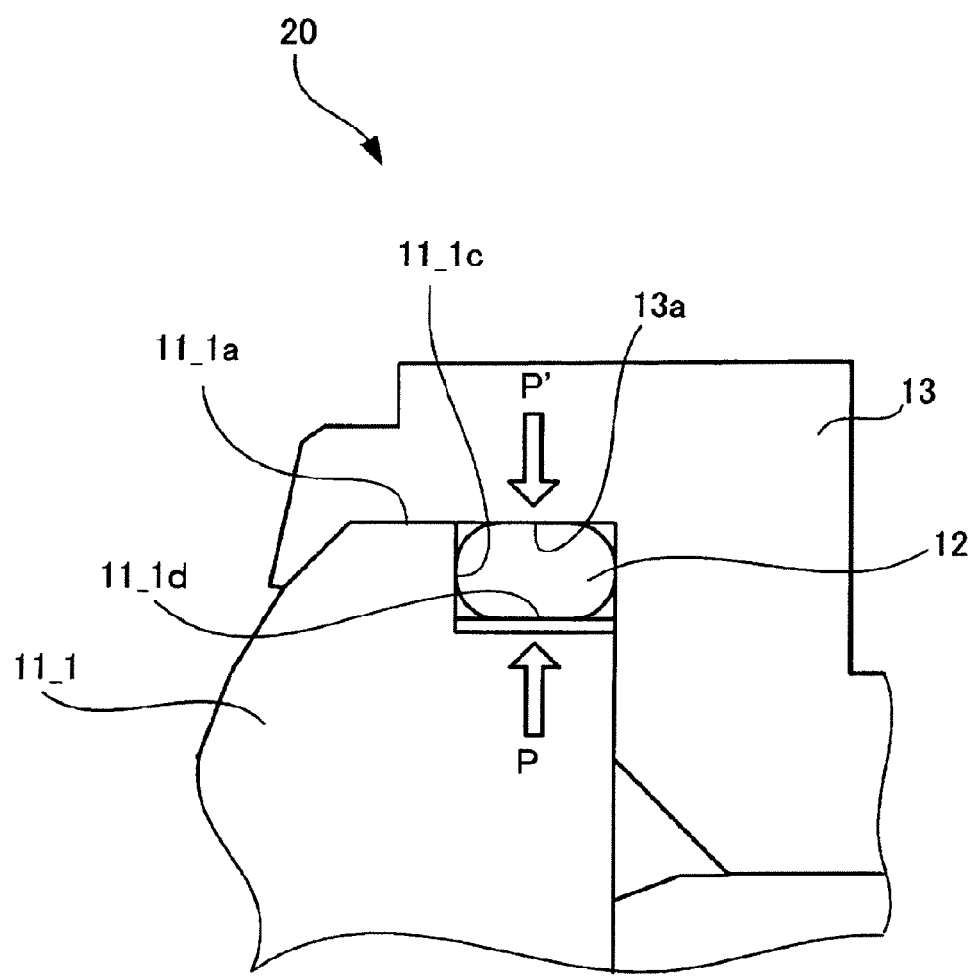
FIG. 3 is an enlarged sectional view illustrating a part, in which the O-ring is disposed, of the lens assembly according to a second embodiment of the invention.

FIG. 3 is an enlarged sectional view illustrating a part, in which an O-ring is disposed, of the lens assembly according to a second embodiment of the invention.

Furthermore, in the following description, elements the same as those of the lens assembly 10 shown in FIGS. 1 and 2 will be referenced by the same reference numerals and signs, and differences therebetween will be described.

As compared with the lens assembly 10 shown in FIGS. 1 and 2, the lens assembly 20 shown in FIG. 3 is different in that the second outer peripheral surface 11_1b is replaced with a second outer peripheral surface 11_1d to be described below.

The second outer peripheral surface 11_1d shown in FIG. 3 is smoothed by applying paint thereto. As such paint, it is possible to appropriately use paint containing at least one selected from epoxy, urethane, silicone, acryl, melamine, vinyl, amino, alkyd, polyester, fluorine, and enamel.

In the lens assembly 20 according to the second embodiment, the second outer peripheral surface 11_1d is smoothed by applying this paint thereto. Therefore, since the second outer peripheral surface 11_1d and the O-ring 12 are in sufficiently close contact with each other, waterproof performance between the second outer peripheral surface 11_1d and the O-ring 12 is sufficiently secured. Accordingly, it is possible to provide the lens assembly 20 improved in waterproof performance.

Figure 4:
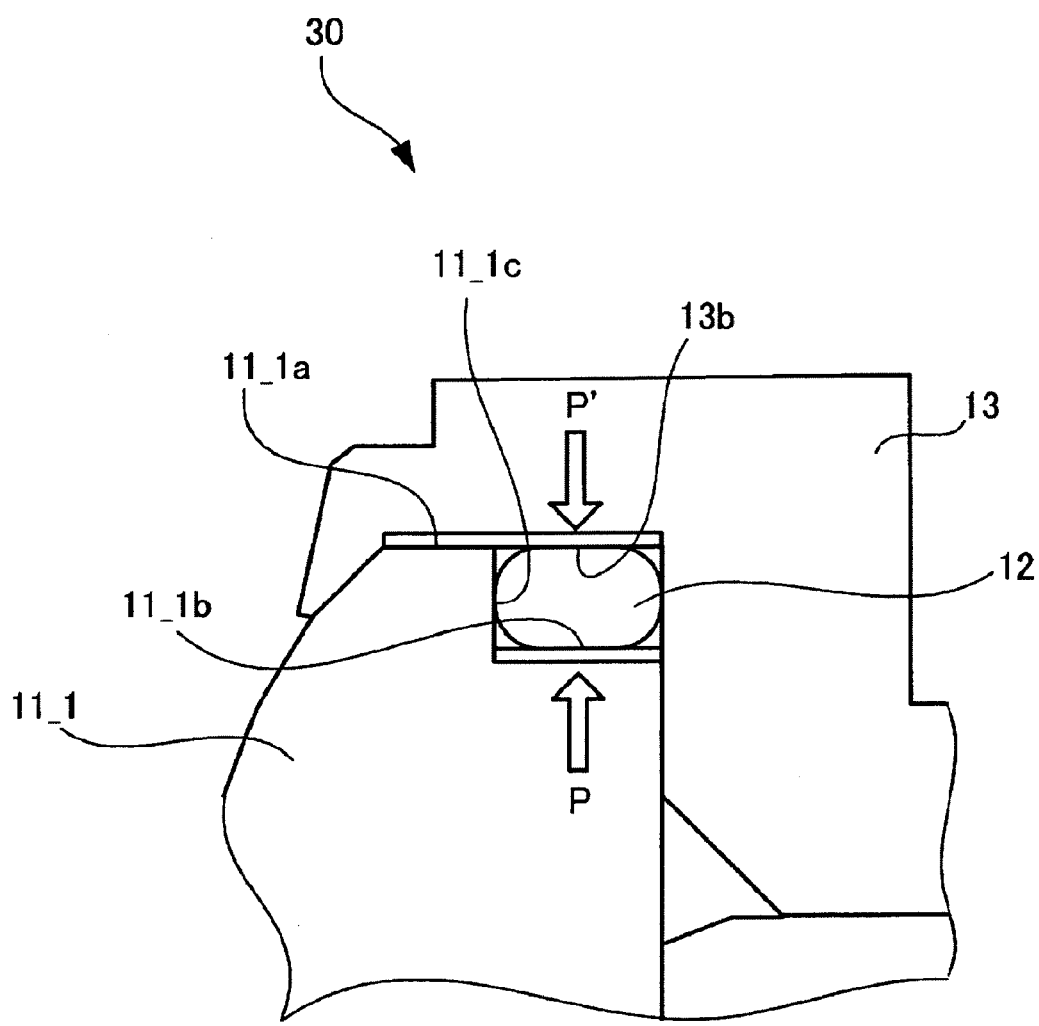
FIG. 4 is an enlarged sectional view illustrating a part, in which the O-ring is disposed, of the lens assembly according to a third embodiment of the invention.

FIG. 4 is an enlarged sectional view illustrating a part, in which an O-ring is disposed, of the lens assembly according to a third embodiment of the invention.

Furthermore, in the following description, elements the same as those of the lens assembly 10 shown in FIGS. 1 and 2 will be referenced by the same reference numerals and signs, and differences therebetween will be described.

As compared with the lens assembly 10 shown in FIGS. 1 and 2, the lens assembly 30 shown in FIG. 4 is different in that the inner surface 13a of the lens frame 13 is replaced with an inner surface 13b to be described below.

Lubricating paint is applied onto a part, being in contact with the first outer peripheral surface 11_1a and the O-ring 12, of the inner surface 13b of the lens frame 13 shown in FIG. 4. The part, being in contact with the O-ring 12, of the inner surface 13b of the lens frame 13 is smoothed by the lubricating paint. In this manner, the O-ring 12 having the smooth surface is pressed by the smoothed part of the inner surface 13b of the lens frame 13. Therefore, the lens frame 13 and the O-ring 12 are in sufficiently close contact with each other. Accordingly, waterproof performance between the second outer peripheral surface 11_1b and the O-ring 12 is sufficiently secured, and waterproof performance between the lens frame 13 and the O-ring 12 is further sufficiently secured. Furthermore, in an assembling process, by applying the lubricating paint onto the inner surface 13b of the lens frame 13, it is possible to prevent situations that the O-ring 12 gets twisted and that the O-ring 12 is sandwiched between the lens frame 13 and the taking lens 11_1, and it is possible to smoothly house the taking lens 11_1 having the O-ring 12 fitted thereon in the lens frame 13. Accordingly, it is possible to efficiently perform the assembling work.

Figure 5:
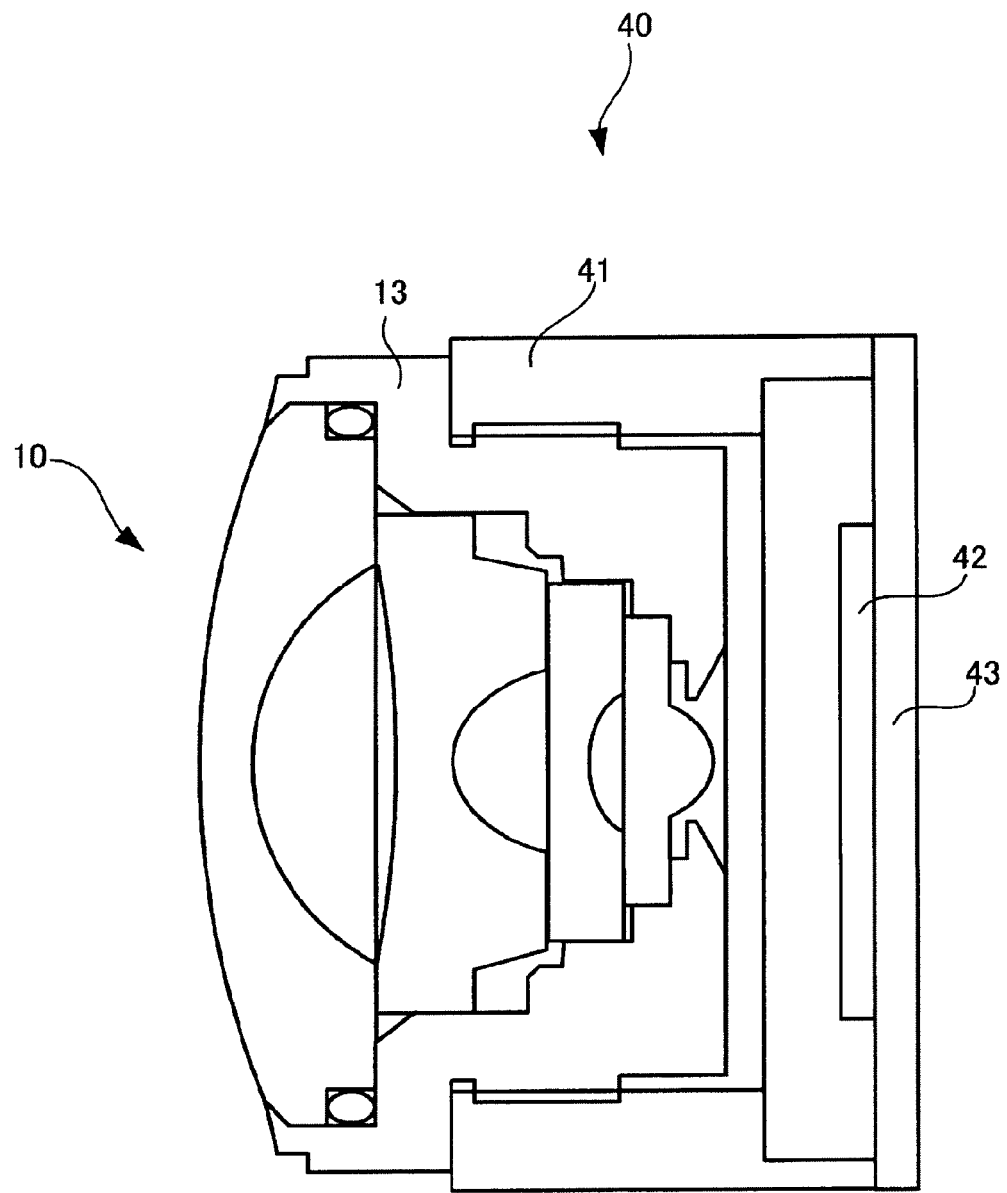
FIG. 5 is a view illustrating a section of a camera unit having the lens assembly shown in FIG. 1, taken along the optical axis of the taking lens.
Figure 6:
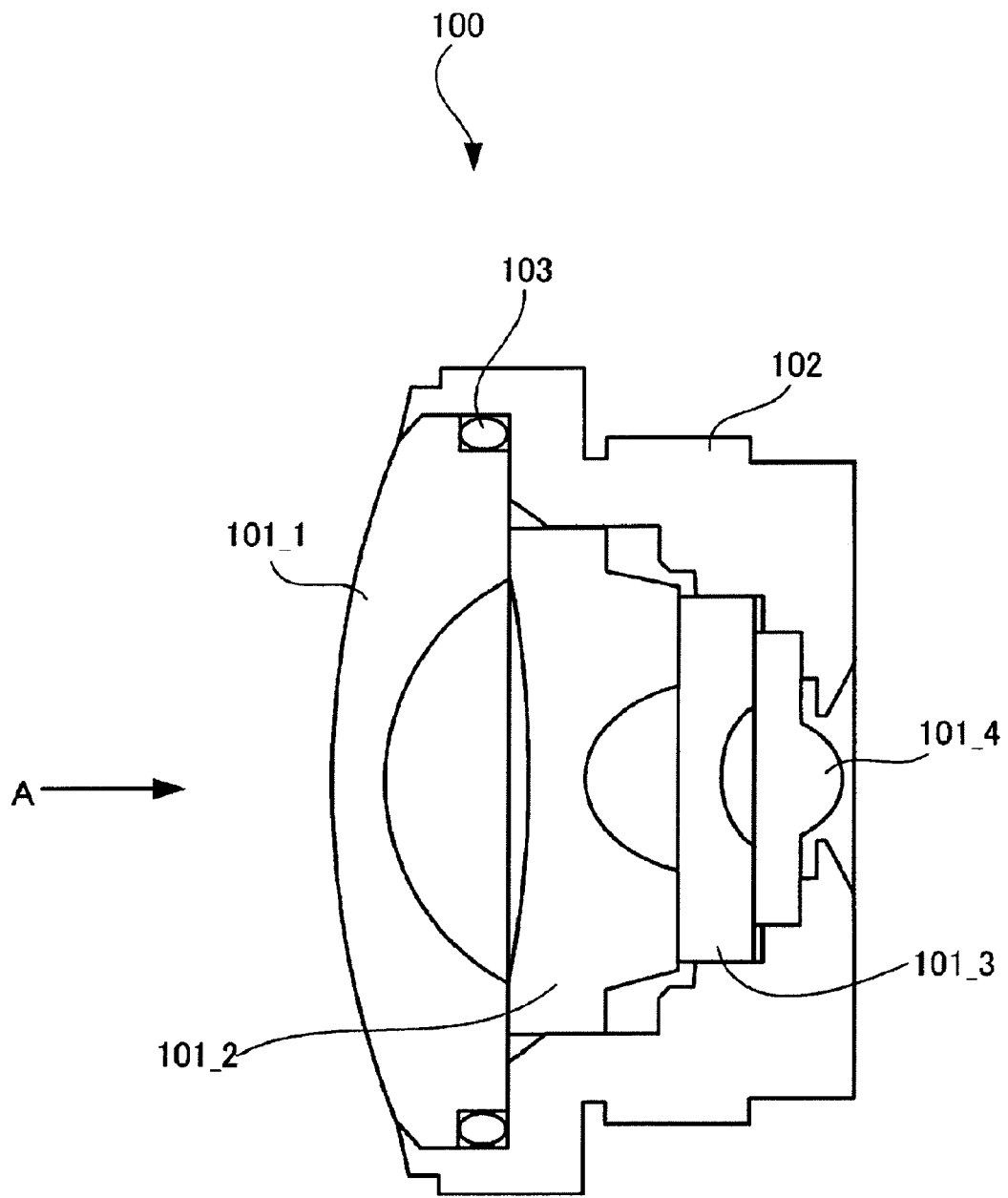
FIG. 6 is a view illustrating a section of a related-art lens assembly, taken along an optical axis of a taking lens.

FIG. 5 is a view illustrating a section of a camera unit having the lens assembly shown in FIG. 1, taken along the optical axis of the taking lens.

The camera unit 40 shown in FIG. 5 is an imaging apparatus according to one embodiment of the invention. The camera unit 40 includes the lens assembly 10 shown in FIG. 1, a camera main frame 41, an imaging device 42, and a substrate 43.

To assemble the camera unit 40, the substrate 43 provided with the imaging device 42 such as CCD is fixedly adhered to the rear of the camera main frame 41. Furthermore, the lens assembly 10 is inserted into the camera main frame 41, and the lens assembly 10 is fixedly adhered to the camera main frame 41. Also, an adhesive is applied between an outer periphery of the lens frame 13 and an inner periphery of an anterior end of the camera main frame 41. Thereby, a waterproof treatment is performed so that water is prevented from entering into the camera unit 40 from the anterior end side thereof. In this manner, the camera unit 40 is assembled. Hence, a waterproof performance of the camera unit 40 is improved.

What is claimed is:

1. A lens assembly comprising:
   a lens that includes
      a first outer peripheral surface, and
      a second outer peripheral surface, the second outer peripheral surface being provided on an image side of the first outer peripheral surface, the second outer peripheral surface having a diameter smaller by one step than that of the first outer peripheral surface, a wall surface being interposed between the first and second outer peripheral surfaces;
      an O-ring that is disposed on the second outer peripheral surface of the lens; and
   a lens frame having an inner surface that is in contact with the first outer peripheral surface and presses the O-ring, which is disposed on the second outer peripheral surface, toward the second outer peripheral surface, wherein
   in the lens, the second outer peripheral surface is made smoother than at least one of the first outer peripheral surface and the wall surface.

2. The lens assembly according to claim 1, wherein the second outer peripheral surface is smoothed by a smoothing process.

3. The lens assembly according to claim 2, wherein the second outer peripheral surface is smoothed by applying paint to the second outer peripheral surface.

4. The lens assembly according to claim 1, wherein in the lens frame, lubricating paint is applied to a part, being in contact with the first outer peripheral surface and the O-ring, of the inner surface of the lens frame.

5. The lens assembly according to claim 2, wherein in the lens frame, lubricating paint is applied to a part, being in contact with the first outer peripheral surface and the O-ring, of the inner surface of the lens frame.

6. The lens assembly according to claim 3, wherein in the lens frame, lubricating paint is applied to a part, being in contact with the first outer peripheral surface and the O-ring, of the inner surface of the lens frame.

7. An imaging apparatus comprising:
   the lens assembly according to claim 1; and
   an imaging device.

8. An imaging apparatus comprising:
   the lens assembly according to claim 2; and
   an imaging device.

9. An imaging apparatus comprising:
   the lens assembly according to claim 3; and
   an imaging device.

10. An imaging apparatus comprising:
    the lens assembly according to claim 4; and
    an imaging device.

11. An imaging apparatus comprising:
    the lens assembly according to claim 5; and
    an imaging device.

12. An imaging apparatus comprising:
    the lens assembly according to claim 6; and
    an imaging device.

* * * * *